United States Patent
Lauk

(10) Patent No.: US 6,396,230 B1
(45) Date of Patent: May 28, 2002

(54) WINDSHIELD WIPER DEVICE

(75) Inventor: Detlef Lauk, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,062

(22) PCT Filed: Aug. 5, 1999

(86) PCT No.: PCT/DE99/02452

§ 371 (c)(1),
(2), (4) Date: Nov. 22, 2000

(87) PCT Pub. No.: WO00/10842

PCT Pub. Date: Mar. 2, 2000

(30) Foreign Application Priority Data

Aug. 21, 1998 (DE) .......................... 198 37 980

(51) Int. Cl.$^7$ .................................. B60S 1/08
(52) U.S. Cl. .................... 318/443; 318/444; 318/DIG. 2
(58) Field of Search ................. 318/443, 444, 318/DIG. 2; 15/250.13, 250.16, 250.17

(56) References Cited

U.S. PATENT DOCUMENTS

| | | | | |
|---|---|---|---|---|
| 4,355,270 A | * | 10/1982 | Cook et al. ................. | 318/443 |
| 4,733,147 A | * | 3/1988 | Muller et al. ............... | 318/443 |
| 4,823,058 A | * | 4/1989 | Buchanan, Jr. et al. ..... | 318/443 |
| 5,654,616 A | * | 8/1997 | Suriano et al. ............. | 318/443 |

FOREIGN PATENT DOCUMENTS

| | | |
|---|---|---|
| DE | 40 39 038 | 6/1992 |
| GB | 2 052 099 | 1/1981 |
| GB | 2 309 802 | 8/1997 |
| JP | 59 092235 | 5/1984 |
| WO | 96 09944 | 4/1996 |

\* cited by examiner

*Primary Examiner*—Bentsu Ro
(74) *Attorney, Agent, or Firm*—Kenyon & Kenyon

(57) ABSTRACT

A windshield wiping device, in particular for cleaning a windshield of the motor vehicle, includes at least one wiper and a control device. The at least one wiper is driven by an electrical drive motor and displaceable between two end positions. The control device processes a current wiper position and switching signals of a manually operated switching element via input variables. The control device controls a supply voltage of the electrical drive motor and a wiper velocity via an output variable. The at least one wiper moves from end position to end position. In a first switch position of the switching element, the at least one wiper has a first velocity. In a second switch position of the switching element, the at least one wiper has a second velocity, which is greater than the first velocity. The at least one wiper in the second switch position moves at the first velocity each time it is in the vicinity of an upper and lower end position. An electrical drive motor has a contact disk system, rotating synchronously with revolutions of the electrical motor for the periodic switchover between the second velocity and the first velocity.

14 Claims, 7 Drawing Sheets

WINDSHIELD WIPER DEVICE

FIELD OF THE INVENTION

The present invention relates to a windshield wiping device for cleaning motor vehicle windshields.

BACKGROUND INFORMATION

Windshield wiping devices for cleaning motor vehicle windshields are conventional. Conventional devices of this type usually have two switch positions for different wiper speeds, as well as a position for intermittent operation. Depending on the degree to which the windshield is wetted, the wiper arm moving over the windshield, due to frictional forces, experiences different levels of resistance. The frictional forces operating on the rubber lips of the wiper are the smallest at the second, more rapid velocity level, and on a wet windshield. The geometric design of the windshield wiping device, with respect to the maximum possible wiping field, must therefore take this operating state into account.

On the other hand, at the usually roughly 30% slower first velocity level, the result, in the turning points, is a smaller wiping field, and therefore also a smaller vision field, because the momentum of the wiping device, as a result of the moments of inertia of the moving parts, and particularly so on a dry windshield, is significantly less than on a wet windshield at the rapid level. A corresponding enlargement of the wiping field at the first level, at the second level on a wet windshield, would lead to a deflection of the windshield wiper beyond the windshield and therefore to faulty functioning or damage to the wiper.

To render the end positions of the wiper arms as congruent as possible at the two velocity levels, there are conventional measures, shortly before the wiper arm reaches the upper or the lower end position, to switch the electrical drive motor of the windshield wiping device to the slower velocity level and, as a result, to maintain the inertial forces, and thus the lag of the windshield wiping device, at as constant a value as possible.

Thus, WO PCT Publications No. 96/09944 describes a windshield wiping device having a supplemental switching device, which, shortly before the turning points, switches from a more rapid velocity level to a slower level. For this purpose, an electrical switch is mechanically coupled to the rotor of the electrical drive motor. The switch has a plurality of concentric cams for the periodic control of contact tags. Disadvantageous in the system is the relatively complex and bulky design of the switch, which, in addition, cannot be realized using conventional switches as they are usually employed in motor vehicles. Also, no provision is made for an integrated control of a park position.

SUMMARY OF THE INVENTION

The windshield wiping device according to the present invention has the particular advantage, as a result of simple mechanical components, of achieving a maximum possible wiping field on the windshield of a motor vehicle. This is essentially achieved as a result of the fact that at the second velocity level, which is higher than a first velocity level of the electrical drive motor of the windshield wiping device, shortly before the at least one wiper arrives at the upper or the lower end position (the turnaround point), a switchover takes place to the first, i.e., slower velocity level, and, shortly after leaving the upper or lower end position, a return to the second velocity level is carried out. This switchover occurs in a simple manner through the use of a contact disk system rotating in concert with the motor revolutions. The contact disk system, for example, is able to periodically change the motor velocity through three contact tags sliding on partially interrupted pathways and acting as switching contacts. In the same manner, the precise resting position of the windshield wiper can also be assured in the lower end position after switchoff. For this purpose, it is advantageous to arrange two contact disk systems so as to be coaxial in relation to each other, so that a fixed assignment of the angle positions of the contact disks is made possible with regard to the position of the windshield wiper on the windshield.

It is particularly advantageous that the contact disk systems have a simple interface with regard to a steering column switch. The steering column switch has a very simple and proven design and function.

In an advantageous embodiment, the contact disk has connected to it not the entire engine voltage but rather a small control voltage, which can then drive a power transistor or thyristor.

Another advantageous embodiment of the present invention can provide for electronic detection of the wiper position, for example using a rotating perforated disk for driving a photo-electric reader or a Hall sensor. Its signals can be used by a downstream evaluating circuit for the precise maintenance of a maximum wiping field.

DETAILED DESCRIPTION

Description of the Exemplary Embodiments

Figure 1:
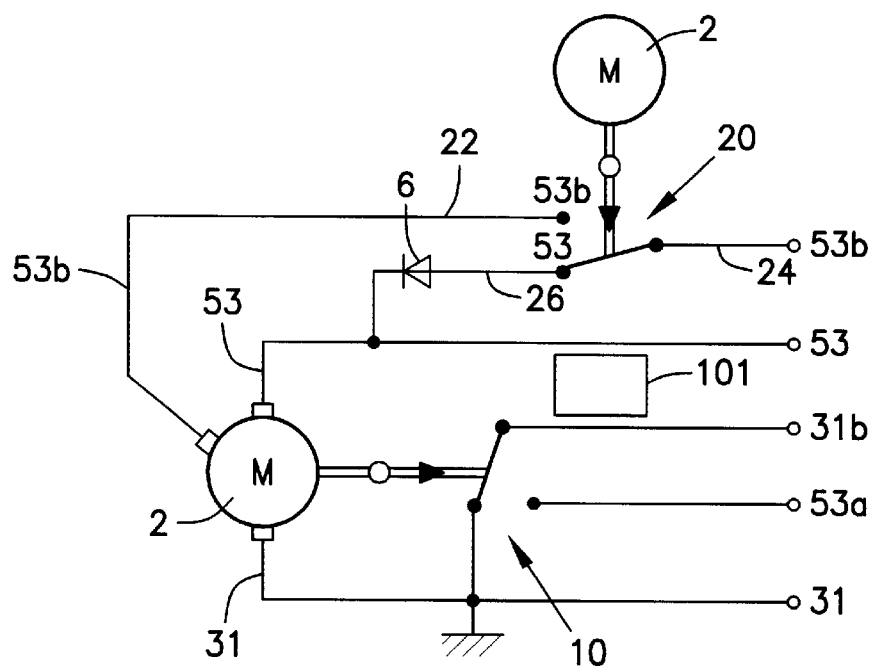
FIG. 1 shows a basic circuit diagram for variable velocity control of a windshield wiping device according to the present invention.

FIG. 1, in a basic circuit diagram, shows a changeable control of the velocity of a windshield wiping drive for cleaning a windshield of a motor vehicle. Using this device, the windshield wiper may, at each wiper velocity selected by a driver, reach, in each case, approximately the same upper and lower end position, as result of which the kinematic design can optimally be aimed at a maximum wiping field.

An electrical drive motor 2, indicated only schematically, can be recognized, which has three electrical connections. A grounded connection leads to a clamp 31 and thus to a negative pole of an undepicted vehicle battery or to a vehicle ground. A clamp 53, via a steering column switch (FIG. 3) that is undepicted in FIG. 1, is routed to a positive pole of the vehicle battery, if the drive motor is to run at a first, i.e., slower level I. If drive motor 2 is to be operated at a more rapid, second level II, then, additionally, a shunt winding of drive motor 2 is connected to a clamp 53b.

Drive motor 2, furthermore, is coupled to two contact disk systems 10, 20, which permanently rotate at a fixed transmission ratio with respect to a rotor 40 of drive motor 2. First contact disk system 10 is responsible for the park position run and is described further below. Second contact disk system 20 is responsible for switching back from more rapid level II to slower level I of drive motor 2, if the at least one wiper is positioned shortly before the upper or lower end position.

For this purpose, and shortly before one of the end positions, a switchover is carried out via contact disk system 20 from clamp 53b to clamp 53, which is connected via a reversed-polarity damping diode 6 to a drive motor 2 and for a short time switches over the latter to the slower operating level. Upon leaving the end position, clamp 53b is switched back to shunt 53b of drive motor 2 via contact disk system 20, as result of which drive motor 2 again runs at the more rapid operating level, until it has reached its other end position. These processes are carried out periodically, each time one of the end positions of the wipers is reached. Furthermore, there is provided an arrangement 101 for detecting the current wiper position.

FIGS. 2a–d depict, in four basic circuit diagrams, one complete motor revolution at more rapid operating level II. It is illustrated how contact disk system 20 provides for a switchover from more rapid operating level II to slower operating level I, in each case shortly before an end position of the windshield wiper is reached. Identical parts of FIG. 1 are designated using identical reference numerals and are not described again. In all representations of FIG. 2, steering column switch 4 is disposed in position II for more rapid level II.

Contact disk system 20 has a rotating, planar, electrically conductive contact disk 21 (FIG. 5), on which a fixed collector brush 28 slidingly engages three contact tags. Each of these contact tags slides on one of three paths of contact disk 21 that are concentrically arranged with respect to each other and electrically connected. A central path 24 is configured so as to be continuous and is connected, via the central contact tag of collector brush 28, to clamp 53b on steering column switch 4 and, via the latter, can be connected to the positive pole of the vehicle battery. An interior path 22 and an exterior path 26 both have segment sections disposed at 180° and having insulating coatings. As result of the rotation of contact disk 21, the interior or the exterior contact tag of collector brush 28 slides, interchangeably, on an insulating or a conductive coating of interior path 22 or exterior path 26 and thus functions as a simple switchover device. Therefore, clamp 53b can be connected either to the corresponding clamp of the shunt winding on drive motor 2 or, via a reversed-polarity damping diode 6, to the main winding.

Figure 2A:
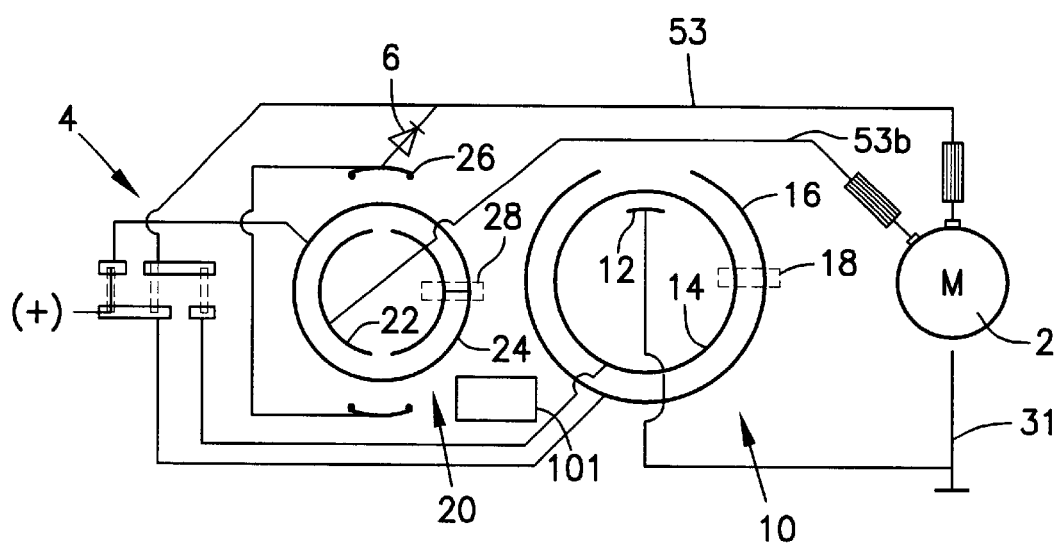
FIG. 2a shows a basic circuit diagram of a first switch position.

FIG. 2a depicts a first rotor position, in which central path 24 connects collector brush 28 to interior path 22 and thus to clamp 53b of the shunt winding of drive motor 2. Drive motor 2 in this switch position, operates at more rapid operating level II. Right-hand contact disk system 10 is responsible for the park position run when the windshield wipers are turned off, in or shortly before reaching the park position of the windshield wiper, and for the moment will not be described in greater detail.

Figure 2B:
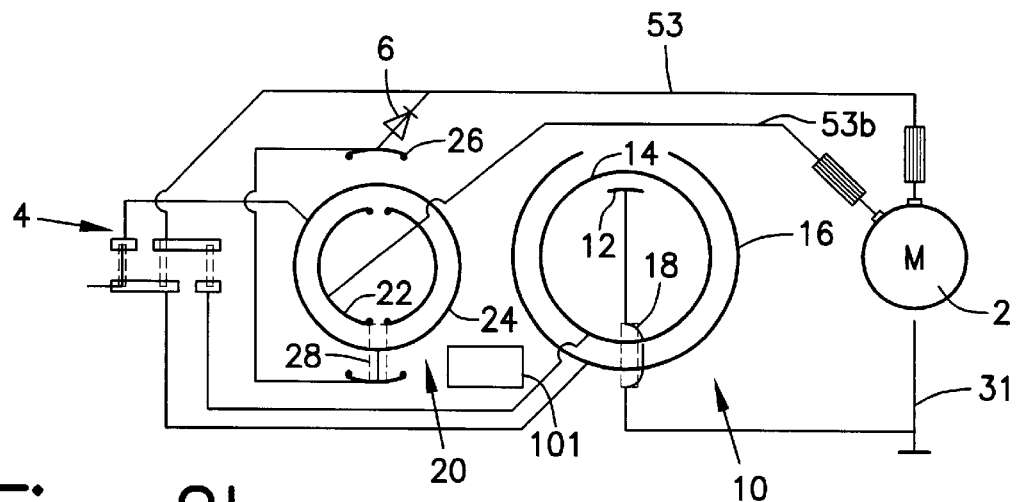
FIG. 2b shows a basic circuit diagram of a second switch position.

FIG. 2b depicts rotor 40 shortly before reaching the upper end position of the wiper. In this context, collector brush 28 is connected simultaneously to central path 24 and exterior path 26, the interior contact tag encountering an insulating coating of interior path 22. The exterior contact tag is connected, via reversed-polarity damping diode 6, to clamp 53 of drive motor 2, which as a result runs at slower operating level I and therefore can assure a constant location of the end position of the windshield wiper.

Figure 2C:
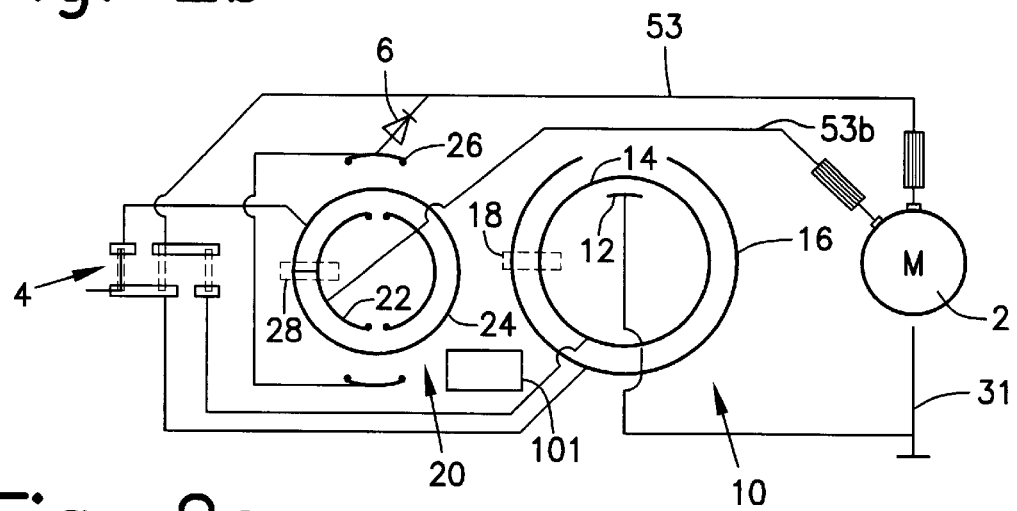
FIG. 2c shows a basic circuit diagram of a third switch position.

FIG. 2c depicts a further position of rotor 40 of drive motor 2 during a downward movement of the wiper. In this context, the central contact tag of collector brush 28 is connected, via central path 24 and interior path 22, to the interior contact tag, i.e., clamp 53b of drive motor 2 is connected. Drive motor 2 in turn runs at its more rapid operating level II.

Figure 2D:
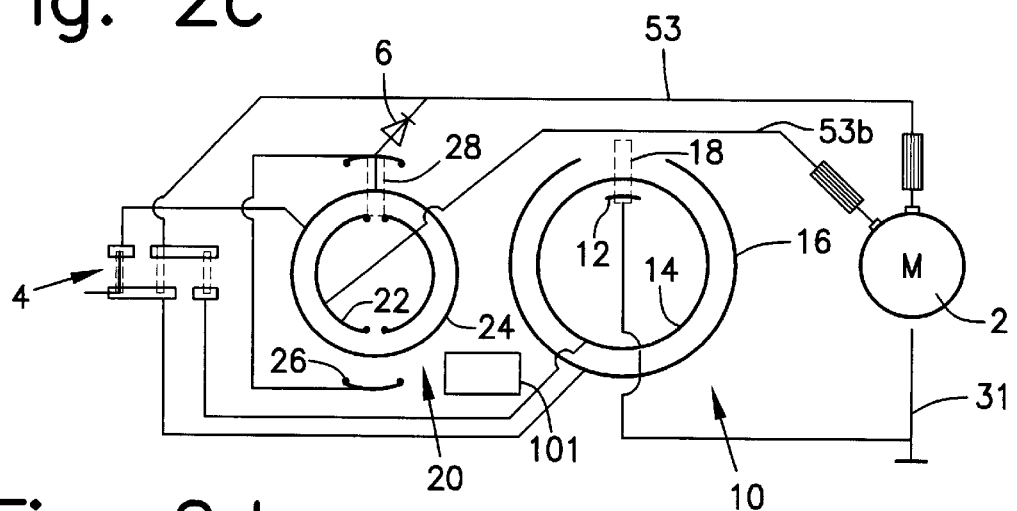
FIG. 2d shows a basic circuit diagram of a fourth switch position.

FIG. 2d, finally, depicts an operating position shortly before the windshield wiper reaches the lower end position. Here too, collector brush 28 is connected to central path 24 and exterior path 26 of contact disk 21, as a result of which clamp 53 is connected to the positive pole of the battery, and drive motor 2 runs at its slower operating level I.

FIGS. 3a–3f illustrate the functions of the park position operation, which is essentially to ensure a reliable and precise placing of the wiper in the park position, the same parts shown in the preceding Figures being provided with the same reference numerals.

Figure 3A:
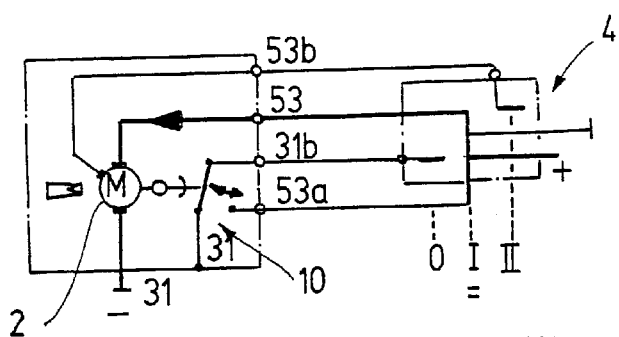
FIG. 3a shows a first switch position having corresponding representations of current flow.

FIG. 3a depicts drive motor 2 at its first slower operating level I. In this context, steering column switch 4 is at first switching level I, and the positive pole of the battery is connected to clamp 53 of drive motor 2. Clamp 31 on drive motor 2 is connected to the negative pole of the vehicle battery.

Figure 3B:
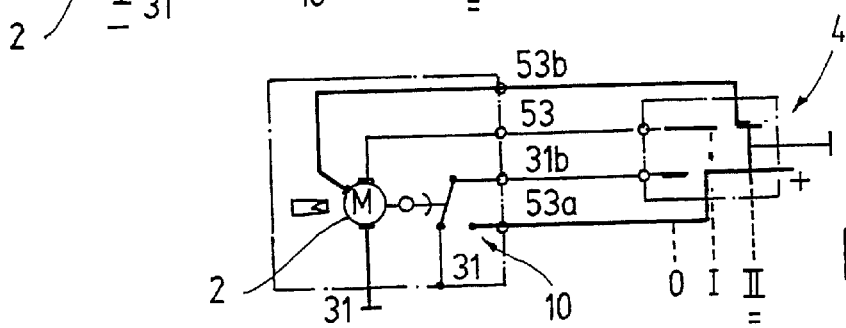
FIG. 3b shows a second switch position having corresponding representations of current flow.

FIG. 3b depicts steering column switch 4 at the second level, in which drive motor 2 rotates at more rapid velocity level II. Clamp 53b of drive motor 2, in this context, is connected to the positive pole of the vehicle battery, whereas clamp 53 is not connected.

Figure 3C:
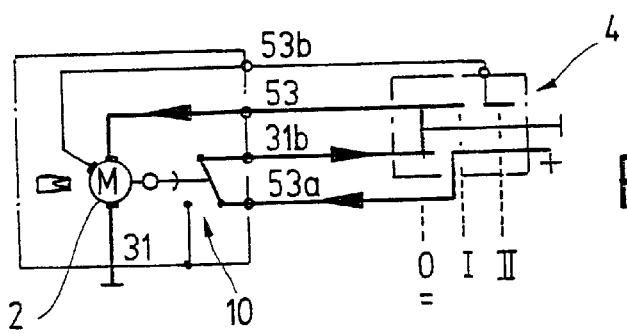
FIG. 3c shows a third switch position having corresponding representations of current flow.

FIG. 3c illustrates the switching off of the windshield wiper after operation. Steering column switch 4 is in a zero position. Since the wipers are not yet in their end position, drive motor 2 must continue to run until the park position of the wipers has been reached. For this purpose, drive motor 2 is provided with contact disk system 10, which, in all rotor positions except the end position, makes possible a current flow from clamp 31b to clamp 53a and thus, via a contact bridge in steering column switch 4, makes an electrical connection from the positive pole of the vehicle battery to connection 53 of drive motor 2 possible.

Figure 3D:
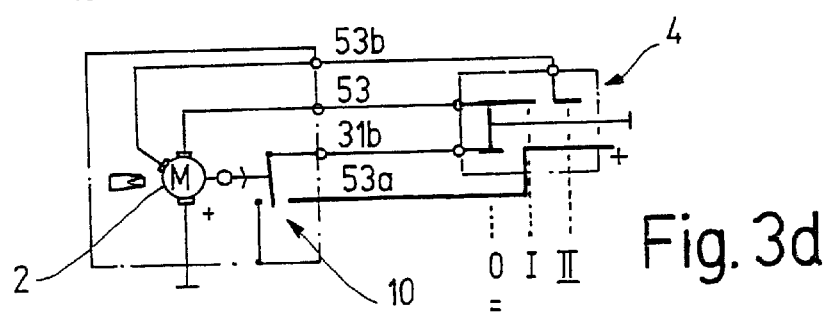
FIG. 3d shows a fourth switch position having corresponding representations of current flow.

FIG. 3*d* depicts the approach of the wiper to its park position. The current flow between connection 53*a* and connection 31*b*, in this context, is already interrupted, but drive motor 2 continues to run due to its inertia.

Figure 3E:
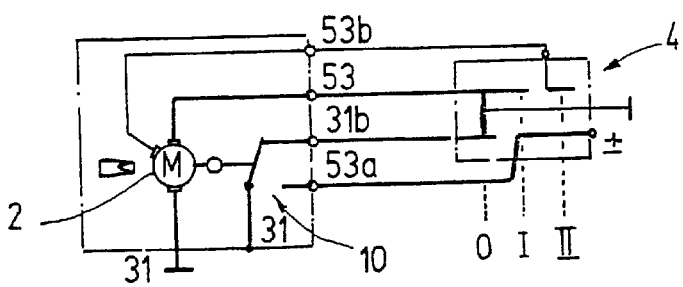
FIG. 3e shows a fifth switch position having corresponding representations of current flow.

FIG. 3*e* depicts the park position, now definitely reached. In this context, drive motor 2 is short-circuited via contact disk system 10 through a connection of 31 to 31*b* or 53. The motor is thus actively braked.

Figure 3F:
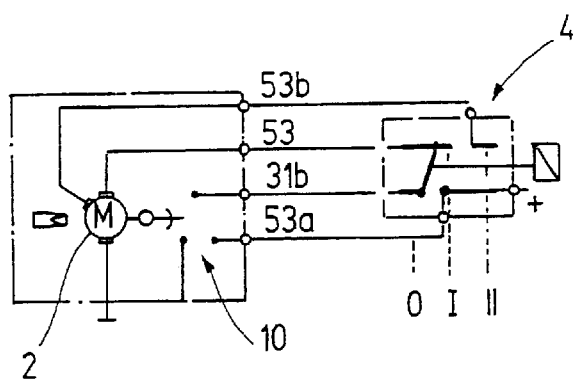
FIG. 3f shows a sixth switch position having corresponding representations of current flow.

FIG. 3*f*, finally, depicts an intermittent operation of drive motor 2. The control takes place via a relay, and a start-up can be achieved by a direct flow of current corresponding to FIG. 3*a*, or by a park position run, corresponding to FIGS. 3*c*, 3*d*, and 3*e*.

Figure 4A:
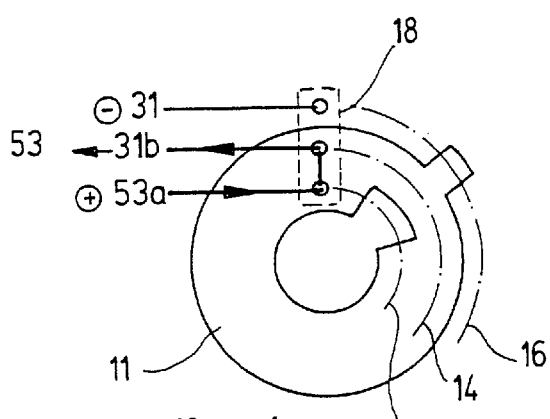
FIG. 4a shows a first change of a switch position in response to turning a contact disk.
Figure 4B:
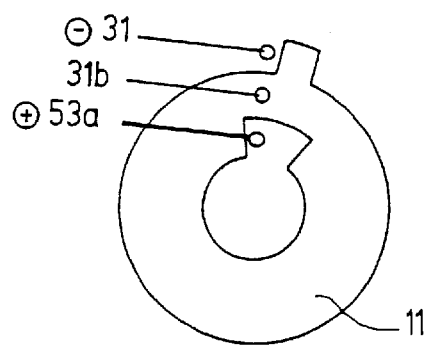
FIG. 4b shows a second change of a switch position in response to turning a contact disk.
Figure 4C:
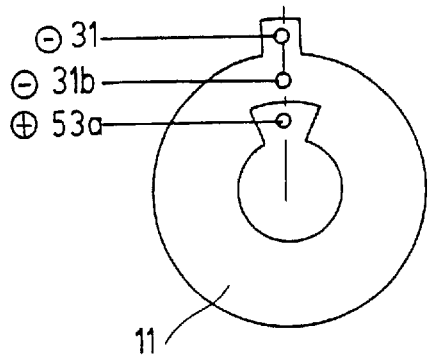
FIG. 4c shows a third change of a switch position in response to turning a contact disk.

FIGS. 4*a* through 4*c* depict in three schematic illustrations a motion sequence of contact disk system 10, when at least one windshield wiper reaches the park position. In this context, it can be seen how, through the rotation of contact disk 11, the switchover takes place from the connection of clamps 31*b* and 53*a* (FIG. 4*a*) to a connection of clamps 31 to 31*b* (FIG. 4*c*), and thus drive motor 2 is short-circuited.

Figure 5:
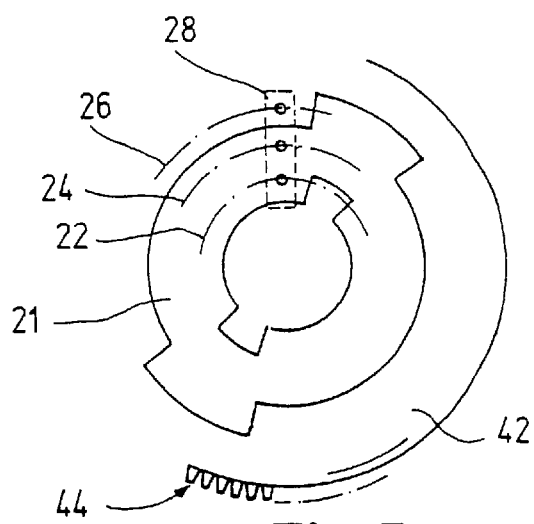
FIG. 5 shows a schematic representation of a contact disk.

FIG. 5 shows contact disk 21 of contact disk system 20, which is provided for switching velocities. Recognizable here are continuous central path 24 as well as interior path 22 and exterior path 26, each interrupted twice and provided at these interrupted locations with an insulating coating. Collector brush 28 that has its three contact tags running on the contact disk, in this context, is only sketched in. Also only sketched in, in this illustration, is support disk 42, on which both contact disks 11 and 21 are secured, above and below, and which is provided on the exterior with gear teeth 44 for engaging with a worm gear 46 connected to rotor 40 of electrical drive motor 2.

Figure 6:
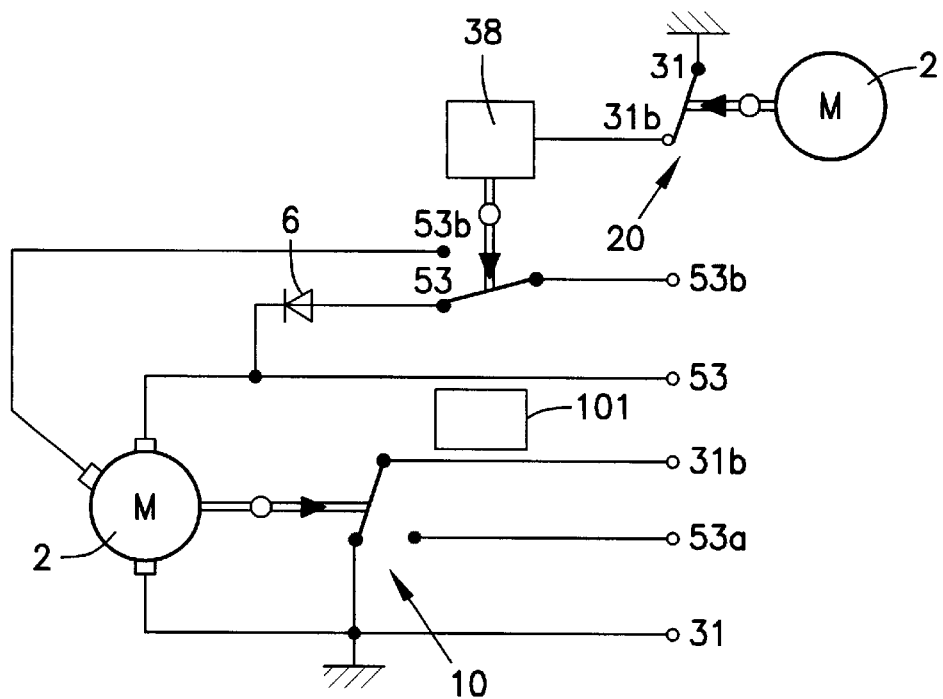
FIG. 6 shows a basic circuit diagram for variable velocity control of a windshield wiping device in an altered configuration.

FIG. 6, furthermore, depicts an alternative drive of electrical drive motor 2. Instead of connecting the full operating current directly via contact disk system 20, the latter functions solely to drive an electrical switch 38, for example a thyristor or a power transistors which is then able to put through the full power current to drive motor 2 and thus is able to assure a better wear resistance of the contact tags of collector brush 28 of contact disk system 20. The remaining design is analogous to that in FIG. 1 and will not be described here once again.

Figure 7:
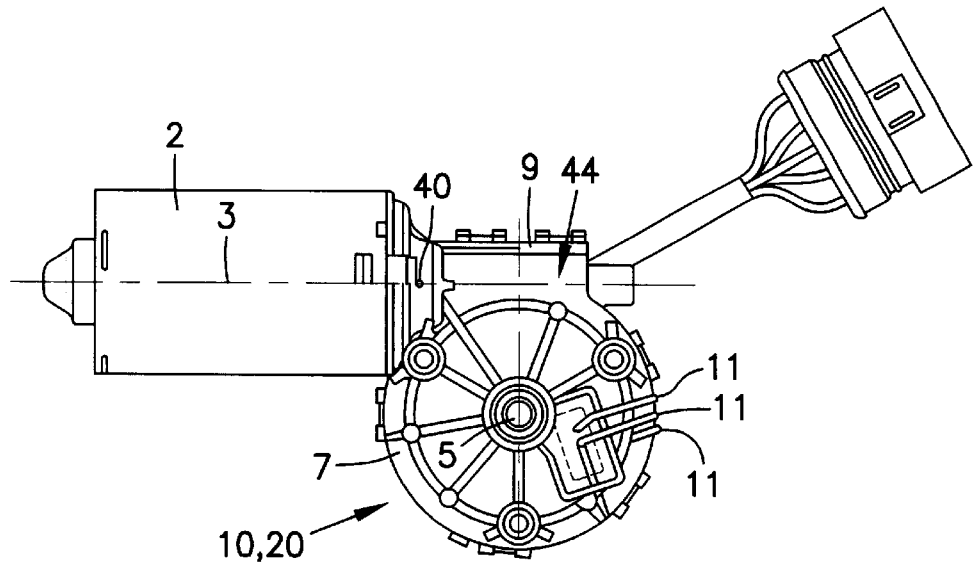
FIG. 7 shows an overall schematic representation of an electrical drive motor having contact disk systems.

FIG. 7 depicts a schematic overall representation of an electrical drive motor 2 that has contact disk systems 10 and 20 built into a transmission housing of the worm gear driven by a motor drive shaft. Axes of rotation 3 and 5 of drive motor 2 and of contact disk systems 10, 20, that are arranged so as to be coaxial with respect to each other and are installed in a common housing 7, are situated so as to be perpendicular with respect to each other. Contact disks 11, 21 are mounted on a common support disk 42 (FIG. 5), which has external gear teeth 44 (FIG. 5) and which engages, permanently and with virtually no play, with a worm gear mounted on rotor 40 of electrical drive motor 2. Rotor 40 and the worm gear are not depicted in detail. They are located in a housing 9 of drive motor 2, housing 9 and housing 7 being able to be configured in one piece. The transmission ratio of these gear teeth 44 must be selected 50 that a switching sequence is assured that is synchronous with the turning motions of the windshield wiper. In FIG. 7, furthermore, connecting lines 11 can be seen which connect the contacts rubbing on the contact disk to the corresponding clamps.

Figure 8:
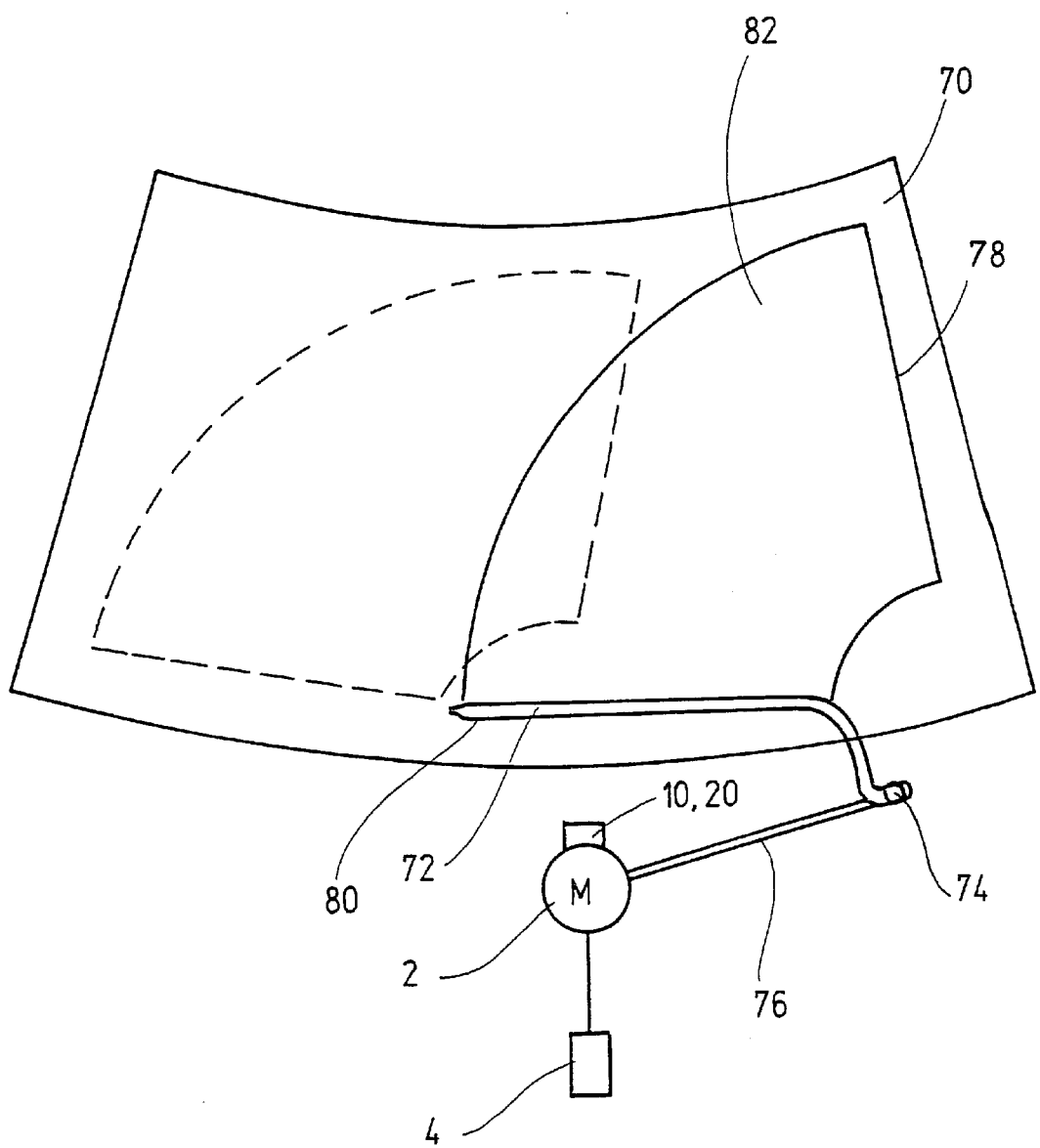
FIG. 8 shows a systematic representation of a wiper system.

In FIG. 8, a schematic view of a windshield wiping device is shown. In this context, a windshield 70 of a motor vehicle has assigned to it a windshield wiping device, which has at least one wiper arm 72. In accordance with the varying specific embodiments of the wiping devices, there may be only one or more than two wiper arms 72. The latter can be placed into an oscillating motion about a chassis-fixed rotational axes 74. In accordance with a drive rod 76, arranged between drive motor 2 and rotational axis 74, in this context, the rotational motion of a rotor of drive motor 2 is translated into the oscillating motion, wiper arm 72 sweeping over a wiping field 82 between an upper end position 78 and a lower end position 80. Drive motor 2 can be actuated via steering column switch 4 in a conventional manner. In addition, contact disk system 10, 20, configured together with drive motor 2, is schematically sketched. The control of wiper arm 72, explained on the basis of the preceding Figures, is carried out by the contact disk system 10, 20. The park position, which is approached via the contact disk system, is located, for example, somewhat beneath lower end position 80.

Figure 9:
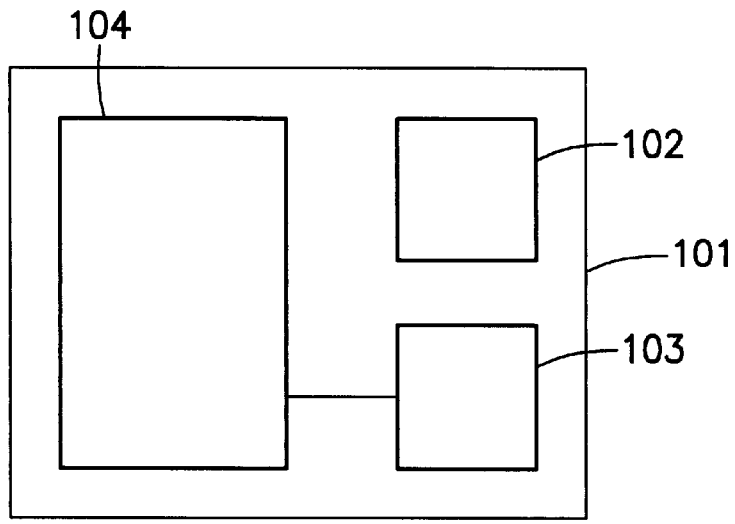
FIG. 9 shows an embodiment of an arrangement for determining a current wiper position.
Figure 10:
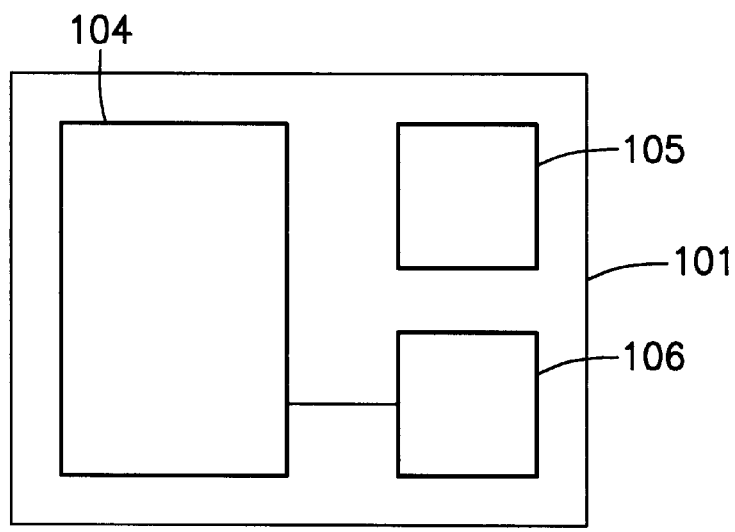
FIG. 10 shows another embodiment of an arrangement for determining a current wiper position.

As shown in FIGS. 1 and 2*a*–2*d*, the contact disk systems 10 and 20 may be provided with an arrangement 101 for detecting the current wiper position. FIG. 9 shows an exemplary embodiment of the arrangement 101 for detecting the current wiper position for the optical detecting of the current wiper position using perforated disks 102, photoelectric readers 103, and a downstream evaluation circuit 104. FIG. 10 shows another embodiment of the arrangement 101 for detecting the current wiper position using perforated disks 105, Hall sensors 106, and a downstream evaluation circuit 104.

What is claimed is:

1. A windshield wiping device comprising:
    a manually operated switching device;
    at least one wiper displaceable between a first end position and a second end position, the at least one wiper having a first velocity when the switching device is in a first switch position, the at least one wiper having a second velocity when the switching device is in a second switch position, the second velocity being greater than the first velocity, the at least one wiper moving at the first velocity while the switching device is in the second switch position each time the at least one wiper is near an upper end position and a lower end position;
    an electrical drive motor driving the at least one wiper, the electrical drive motor including a first contact disk system, the first contact disk system rotating synchronously with revolutions of the electrical drive motor, the first contact disk system providing periodic switching between the second velocity and the first velocity; and
    a control device processing a current wiper position and switching signals of the switching device via input variables, the control device controlling a supply voltage of the electrical drive motor and a velocity of the at least one wiper via an output variable;
    wherein the electrical drive motor further includes a second contact disk system rotating synchronously with the revolutions of the electrical drive motor, the second contact disk system providing position-precise switching off of the at least one wiper in a park position after the switching device is placed in an off position.

2. The device according to claim 1, wherein:
    the windshield wiper device is for cleaning a windshield of a motor vehicle.

3. The device according to claim 1, wherein:

the first contact disk system comprises a planar electrically conductive contact disk, the planar electrically conductive contact disk including an interior path, a central path, and an exterior path, the interior path, the central path, and the exterior path being arranged concentrically about a common axis.

4. The device according to claim 3, wherein:

the central path is continuous; and the interior path and the exterior path each have segments that are offset by 180°, the segments having an insulating coating.

5. The device according to claim 4, further comprising:

a fixed three-pole collector brush permanently coupled to the planar electrically conductive disk;

a central contact tag permanently coupled in a conductive manner to the central path; and in accordance with an angular position of the planar electrically conductive disk, one of:

an interior contact slidably arranged on the interior path and coupled in an electrically conductive manner to the central path, and an exterior contact tag slidably arranged on the exterior path and coupled in an electrically conductive manner to the central path.

6. A device according to claim 1, wherein:

the second contact disk system comprises a planar electrically conductive contact disk, the planar electrically conductive contact disk including an interior path, a central path, and an exterior path, the interior path, the central pith, and the exterior path being arranged concentrically about a common axis.

7. The device according to claim 6, wherein:

the central path is continuous; and the interior path and the exterior path each have segments that are offset by 180°, the segments having an insulating coating.

8. The device according to claim 7, wherein:

a fixed three-pole collector brush permanently coupled to the planar electrically conductive disk;

a central contact tag permanently coupled in a conductive manner to the central path; and in accordance with an angular position of the planar electrically conductive disk, one of:

an interior contact slidably arranged on the interior path and coupled in an electrically conductive manner to the central path, and an exterior contact tag slidably arranged on the exterior path and coupled in an electrically conductive manner to the central path.

9. The device according to claim 1, further comprising:

a common support disk rotating synchronously with oscillating motions of the at least one wiper, wherein the first contact disk system and the second contact system each comprise a planar electrically conductive contact disk, the planar electrically conductive contact disks being secured on opposite sides of the common support disk, the planar electrically conductive contact disks each including an interior path, a central path, and an exterior path, the interior path, the central path, and the exterior path being arranged concentrically about a common axis.

10. The device according to claim 9, wherein:

the common support disk includes exterior gear teeth, the exterior gear teeth engaging a worm gear driven by the electrical drive motor.

11. The device according to claim 1, wherein:

the first contact disk system controls an electrical switch.

12. The device according to claim 11, wherein:

the electrical switch is one of a power transistor and a thyristor.

13. The device according to claim 1, wherein:

the first contact disk system and the second contact disk system optical detect the current wiper position using perforated disks, photo-electric readers, and a downstream evaluation circuit.

14. The device according to claim 1, wherein:

the first contact disk system and the second contact disk system detect the current wiper position using perforated disks, Hall sensors, and a downstream evaluation circuit.

* * * * *

UNITED STATES PATENT AND TRADEMARK OFFICE
CERTIFICATE OF CORRECTION

PATENT NO. : 6,396,230 B1　　　　　　　　　　　　　　　　　　　　　　　Page 1 of 1
DATED : May 28, 2002
INVENTOR(S) : Detlef Lauk It is certified that error appears in the above-identified patent and that said Letters Patent is hereby corrected as shown below:

Column 3,
Delete line 7.

Column 5,
Line 41, change "transistors which" to -- transistor, which --.
Line 62, change "50" to -- so --.

Column 7,
Line 32, change "pith" to -- path --.

Signed and Sealed this

Sixth Day of January, 2004

JAMES E. ROGAN
*Director of the United States Patent and Trademark Office*